July 4, 1939.   R. L. BURKE   2,164,567
APPARATUS FOR FABRICATING STRUCTURAL ELEMENTS
Original Filed April 23, 1937   5 Sheets-Sheet 1

WITNESS:

INVENTOR
Richard L. Burke
BY
Busser & Harding
ATTORNEYS.

July 4, 1939. R. L. BURKE 2,164,567
APPARATUS FOR FABRICATING STRUCTURAL ELEMENTS
Original Filed April 23, 1937   5 Sheets-Sheet 2

WITNESS:

INVENTOR
Richard L. Burke
BY
ATTORNEYS.

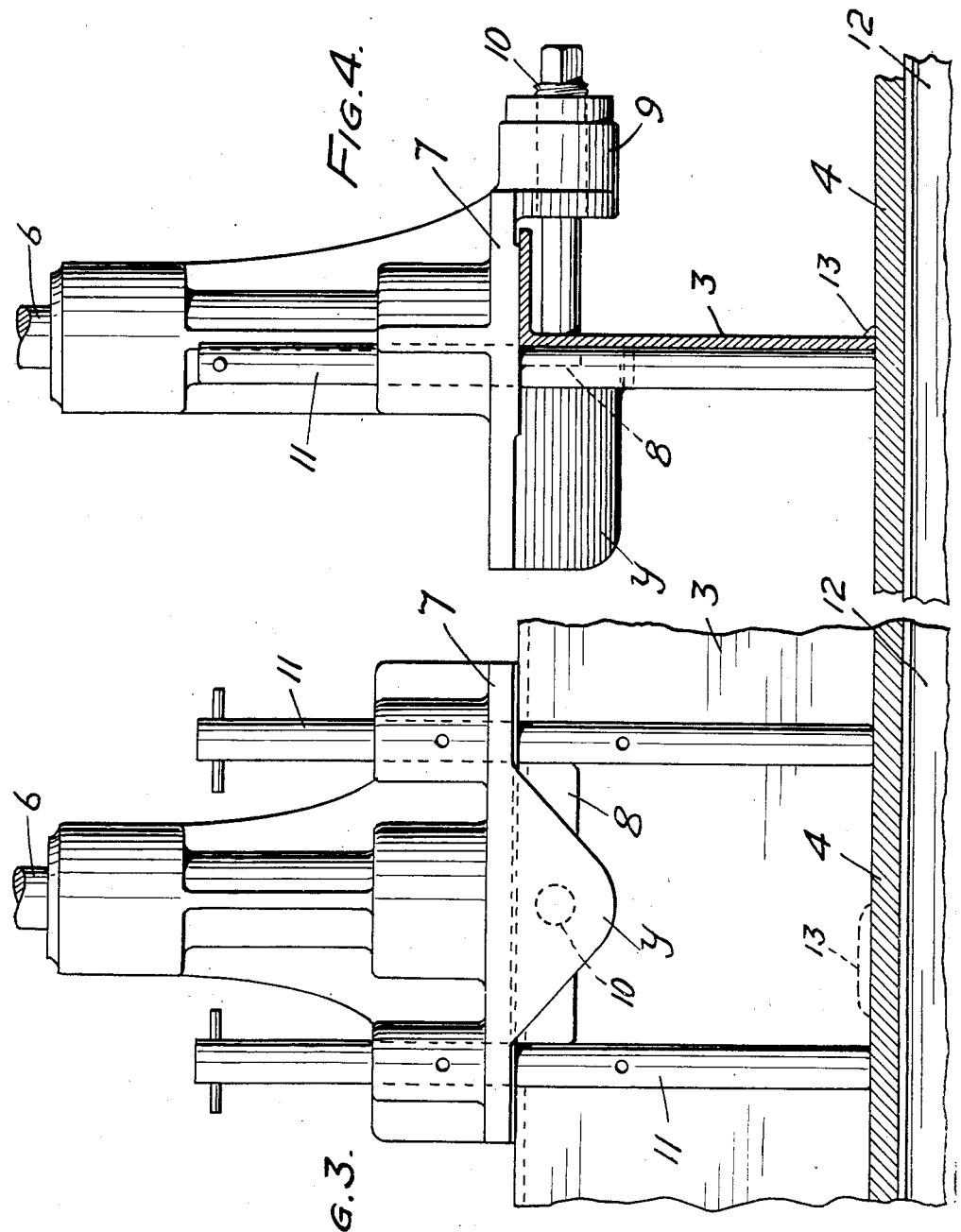

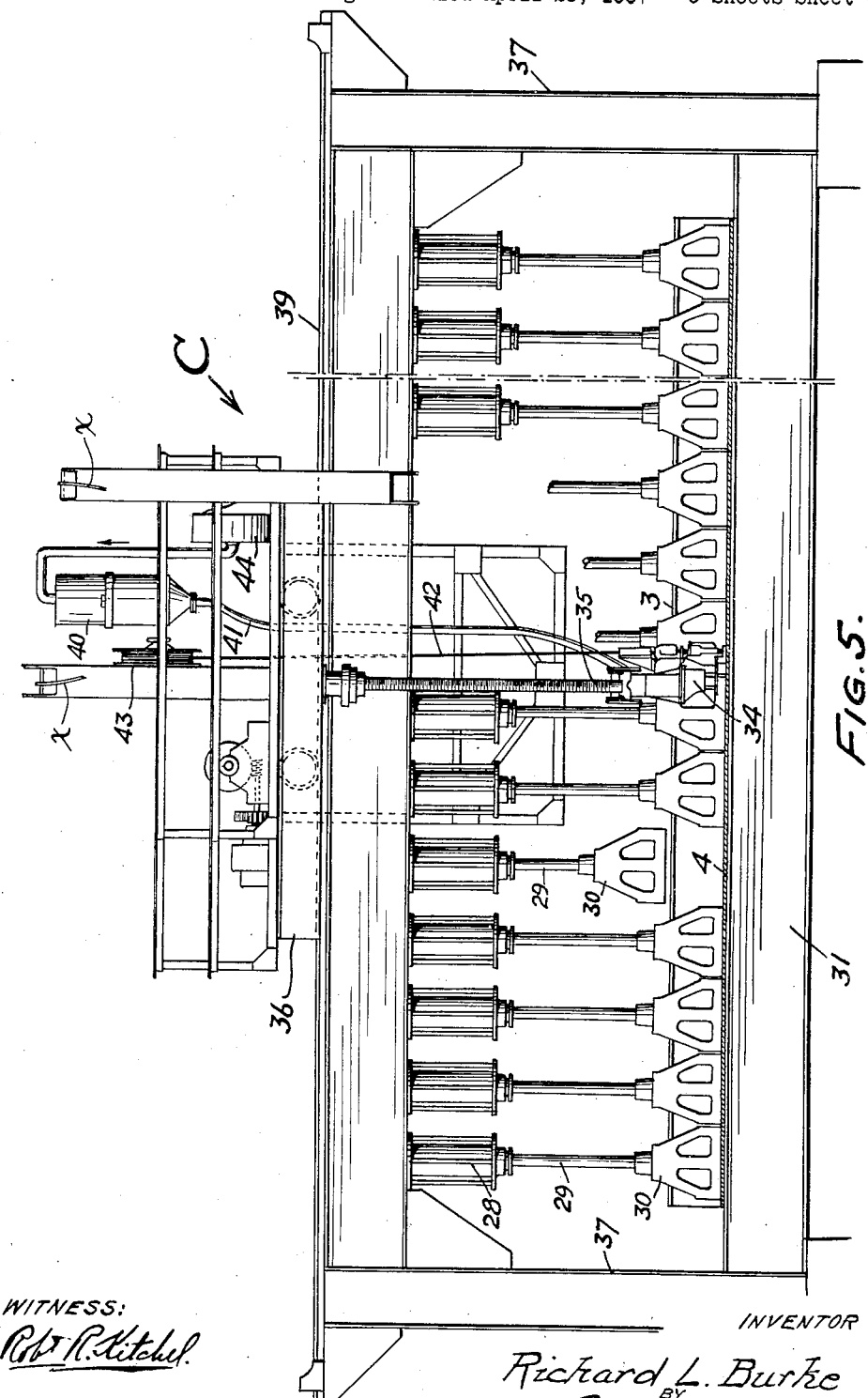

Patented July 4, 1939

2,164,567

UNITED STATES PATENT OFFICE 2,164,567

APPARATUS FOR FABRICATING STRUCTURAL ELEMENTS

Richard L. Burke, Swarthmore, Pa., assignor to Sun Shipbuilding & Dry Dock Company, Chester, Pa., a corporation of Pennsylvania Original application April 23, 1937, Serial No. 138,498, now Patent No. 2,143,109, dated January 3, 1939. Divided and this application September 1, 1937, Serial No. 161,889

9 Claims. (Cl. 113—59)

This invention relates to a method and apparatus for the fabrication of structural elements from metal plates and shapes by welding. From a more specific standpoint, this invention relates to a method and apparatus for fabricating bulkheads, bottom and side shell and deck plating panels, etc. for ships from metal plates and shapes adapted to act as stiffeners, longitudinals, etc.

Heretofore it has been the practice to fabricate various structures, such as bulkheads, bottom shell, side shell and decks from plates and shapes, as stiffeners, longitudinals, etc., by riveting or welding the plates and shapes together. Such procedure is difficult of accomplishment, more particularly in the proper lining up of the plates and shapes, and especially where the plates and shapes are secured by welding, inasmuch as it is difficult, if not impossible, to prevent distortion resulting from the heat of welding. Such procedure has been found further disadvantageous from the standpoint of time and labor.

Now, in accordance with this invention, a method and apparatus has been developed with which the plates and shapes comprising a given structural element, such as a ship's bulkhead, may be easily and accurately fabricated, with a minimum of time and labor, to a point such that they require only to be placed in position and secured.

The method and apparatus in accordance with this invention are especially adaptable to the fabrication of ship bulkheads and bottom shell, side shell and deck plate panels, etc., for ships formed from a series of plates and stiffeners, longitudinals, etc. in following the procedure and with use of the apparatus the necessary shapes are secured to the plates by welding, and the component plates are welded together to form a complete element ready for placing in position and securing.

The method and apparatus in accordance with this invention is especially advantageous in the forming of structural elements for ships, in that the shapes are, without difficulty, secured to the plates with a full metal to metal contact and with avoidance of warping of the plates usually resulting from welding. Further, the plates are secured together with avoidance of warping due to the welding heat to the end that, on completion, the shapes and plates forming the element are integrally related and the element as a whole is true and without distortion.

The details of the method in accordance with this invention and its practice will be described and clarified in connection with a detailed description of the structure of the apparatus, all with reference to the accompanying drawings, in which a preferred embodiment of the apparatus in form for the fabrication of, for example, bulkheads for ships has been illustrated, and in which:

Figures 3 and 4 are views of details of construction of the subject of Figure 2.

Figure 5 is a transverse view, partly in section, showing mechanism for holding and welding plates in the formation of a bulkhead.

Figure 1:
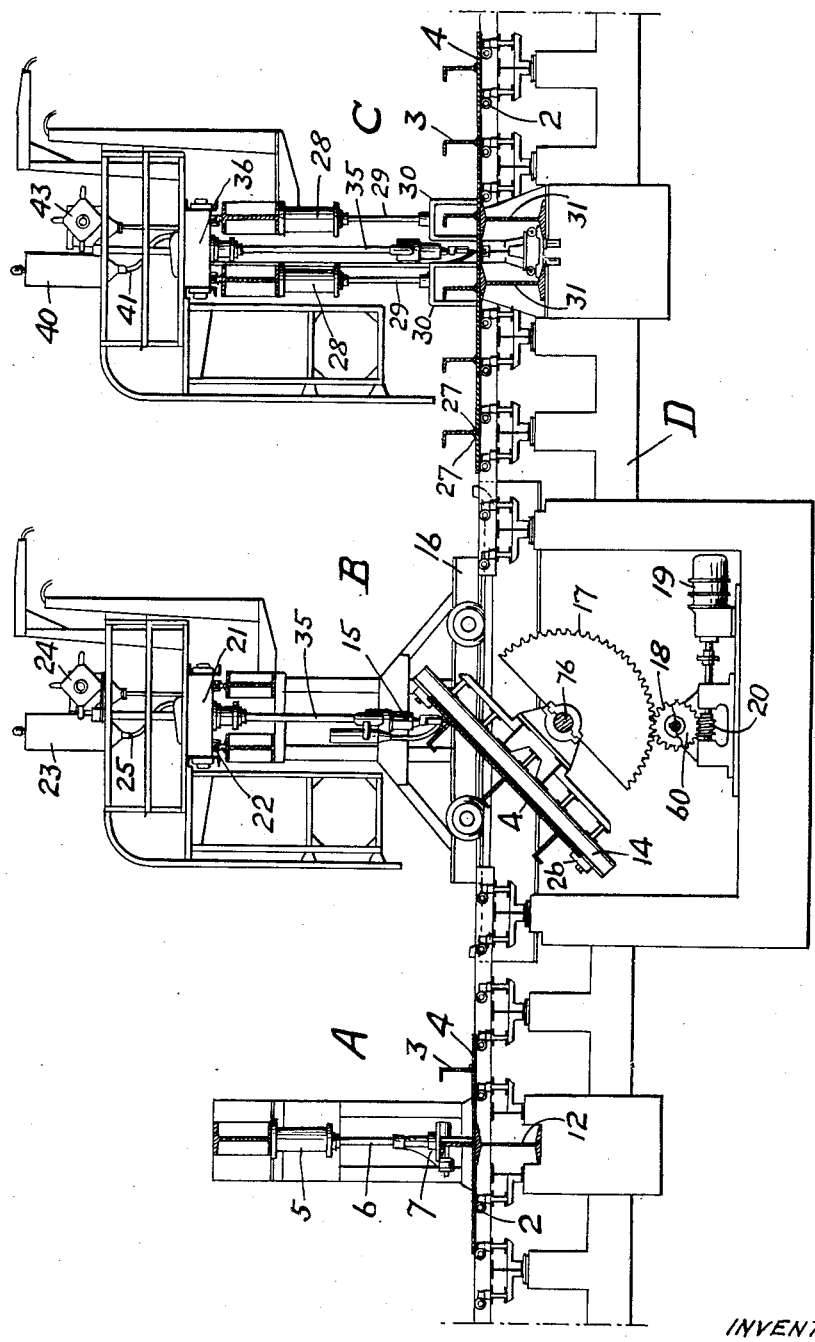
Figure 1 is a side elevation, partly in section, of an apparatus in accordance with this invention and adapted for practice of the method in accordance with this invention.

The apparatus in accordance with this invention, shown generally in Figure 1 of the drawings, comprises three essential elements adapted, respectively, in the formation, for example, of a bulkhead, for the lining and preliminary attachment of stiffeners to plates, for the welding of the stiffeners to the plates and for the welding of the plates together.

The three essential elements of the apparatus are indicated in Figure 1 by the characters A, B and C.

The elements A, B and C are progressively located and are supported from a bed or foundation D, which serves to support a series of castors 2 forming a bed adapted to support and facilitate the passage of plates through the apparatus.

Figure 2:
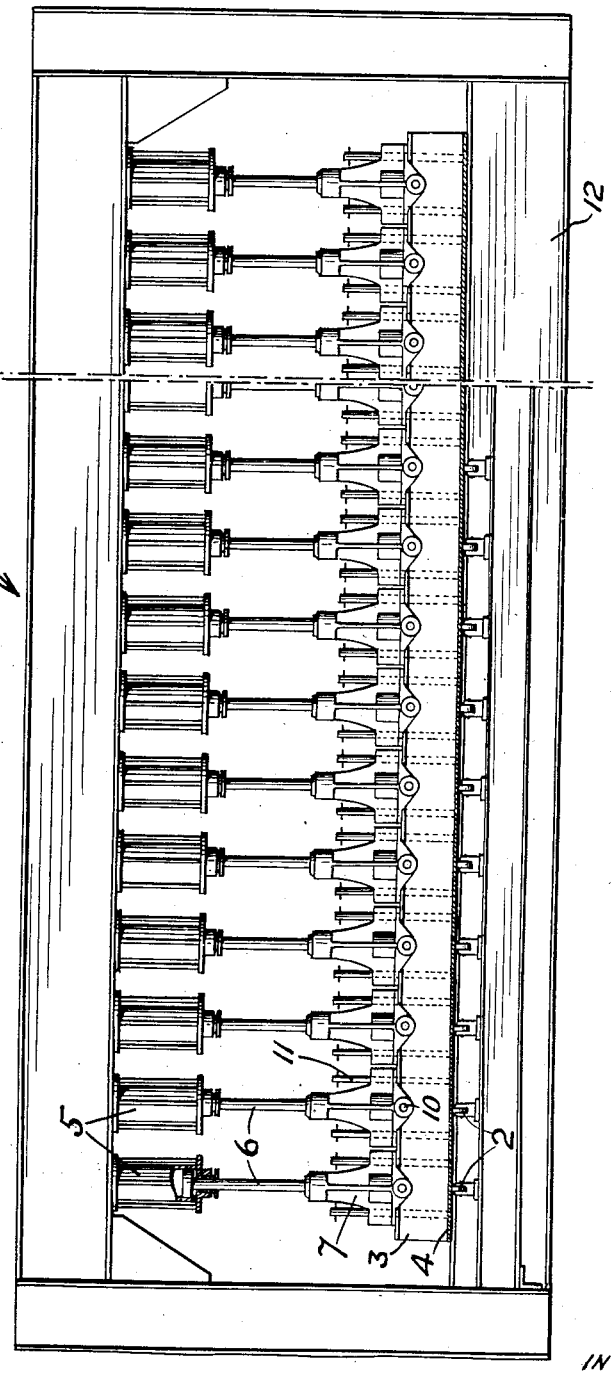
Figure 2 is a transverse view, partly in section, showing mechanism for lining and holding the stiffeners to plates, for tack-welding, in the formation of a bulkhead.

The element A, as has been indicated, functions for the alignment and preliminary securing of stiffeners 3 to the plates 4. This element, the essential details of which are more particularly shown in Figures 2–4, comprises a series of rams, each comprising a pneumatic or hydraulic cylinder 5 within which is a piston provided with a piston rod 6. The series of rams extend transversely of the apparatus and are arranged adjacent to one another.

On the lower end of each of the piston rods 6 is a head 7 having a centrally located dependent flange 8 and a boss 9 depending from its edge. The depending boss 9 is tapped for the passage of a threaded screw 10 squared at its outer end for engagement by a wrench. A counterweight y is formed opposite to the boss 9 to balance the boss and cause the head to remain level.

Passing through each of the heads and in alignment with a face of the flange 8 are a pair of drop pins 11, 11. The drop pins 11, 11 are provided, at their upper ends, with pins adapted to engage the upper side of the head when the head is lifted and are bored intermediate their ends for the passage of pins to maintain them in a raised position when the heads are lifted in order to provide clearance for the placing and removal of a shape with respect to the heads.

A heavy I-beam 12, supported from the foundation D and accurately levelled, extends beneath the several rams.

In the operation of the element A, a plate, supported mainly on the castors 2, is positioned with that portion of it to which a stiffener is to be secured overlying and supported by the I-beam 12, all with the heads 7 in elevated position and with the drop pins 11 carried by the heads, respectively, in raised position to allow clearance. A stiffener 3 is placed on the plate in rough alignment and the heads 7 brought down against the upper edge of the stiffener. The drop pins 11 are then lowered and the face of the stiffener is locked securely against them and the depending flanges 8 by means of the threaded screws 10, which, as has been indicated, will be operated by, for example, a ratchet wrench. This brings the stiffener into accurate alignment as the flanges 8 and the drop pins 11 are in alignment with each other. Pressure is then applied to the heads 7 by means of the pneumatic cylinders 5 and the lower edge of the stiffener is forced into metal to metal engagement with the surface of the plate.

The stiffener is then tack-welded to the surface of the plate at spaced points, as indicated at 13 in Figure 3.

The securing of a stiffener to the surface of the plate having been accomplished, the plate is moved forward and other stiffeners as may be required are similarly secured to it. When the required number of stiffeners has been secured to the plate, it is then moved forward over the bed of castors 2 to the element B, in which the securing of the stiffeners to the plate by welding is completed.

The element B comprises essentially a tilting table 14, to which the plate is secured, and a welder 15 carried by a gantry 16 and capable of transverse movement with respect to the tilting table.

The tilting table 14, which extends transversely of the apparatus, is secured to a suitably supported transverse shaft 76 carrying a segmental gear 17 meshing with a gear 18, which is on a shaft driven by a motor 19 through a worm 20 and gear 60. The arrangement of the tilting table 14 and of its actuating mechanism is such that the surface of the table may be brought level with the bed of castors 2 or may be tilted at an angle of about 45° or other desired angle, to the right or to the left.

The gantry 16, from which the welder 15 is supported, may be of any suitable construction running on rails arranged at opposite sides of the apparatus. The welder may be of any usual or desired type. Thus, it may be an electric welder of the type marketed by the Linde Air Products Company.

The welder will be mounted on the gantry 16 for transverse movement and, for example, may be supported from a trolley 21 adapted for movement transversely of the apparatus on rails 22 carried by the gantry 16. The welder will be adjustable vertically by means of a screw 35, by which it is suspended from trolley 21. The trolley 21 will carry the necessary supplies for the welder, as melt or flux in a tank 23 and wire 42 on a reel 24. The melt or flux will be suitably delivered, for the welding operation, through a tube 25, and the wire will be suitably led to the welder from the reel 24. Electric current will be led to the welder through cables x supported from the trolley 21.

In the operation of the element B, the stiffeners having been tack-welded to a plate in the element A, the plate and stiffeners will be moved onto the tilting table 14, which, for the reception of the plate, will be level with the bed of castors, and the plate will be aligned thereon and secured thereto by means of clamps 26 engaging the opposite edges of the plate. When the plate has been aligned on and secured to the tilting table, the tilting table will be tilted, by operation of the motor 19, for example, to the left, at an angle of 45°. The welder will then be brought down, at one end of a stiffener, to the juncture of the stiffener and plate and, operating transversely of the plate, will fillet-weld the stiffener to the plate from end to end, as shown, for example, at 27, Figure 1. The welding operation will be repeated for the welding from end to end of each of the stiffeners. For the welding of the stiffeners, respectively, with the table and supported plate tilted as shown in Figure 1, it will only be necessary to adjust the vertical position of the welder and to move the gantry 16 to bring the welder in proper relation with the several stiffeners, respectively.

When the welding of the stiffeners from end to end on one side has been completed, with the table 14 tilted to the left, as shown in Figure 1, the table is tilted correspondingly to the right and the fillet-welding of the other side of the stiffeners accomplished. When the welding of the stiffeners has been completed, the tilting table 14 is brought to a level, the clamps 26 removed, and the plate passed on over the bed of castors 2 to the element C, in which a plurality of plates are butt-welded together.

The element C, which, as has been indicated, functions in connection with the butt-welding together of plates to which stiffeners have been secured for the formation of a completed bulkhead, comprises a series of rams extending transversely of the apparatus in two parallel rows and a welder carried on a trolley and mounted for movement transversely of the apparatus between the parallel rows of rams.

Figure 6:
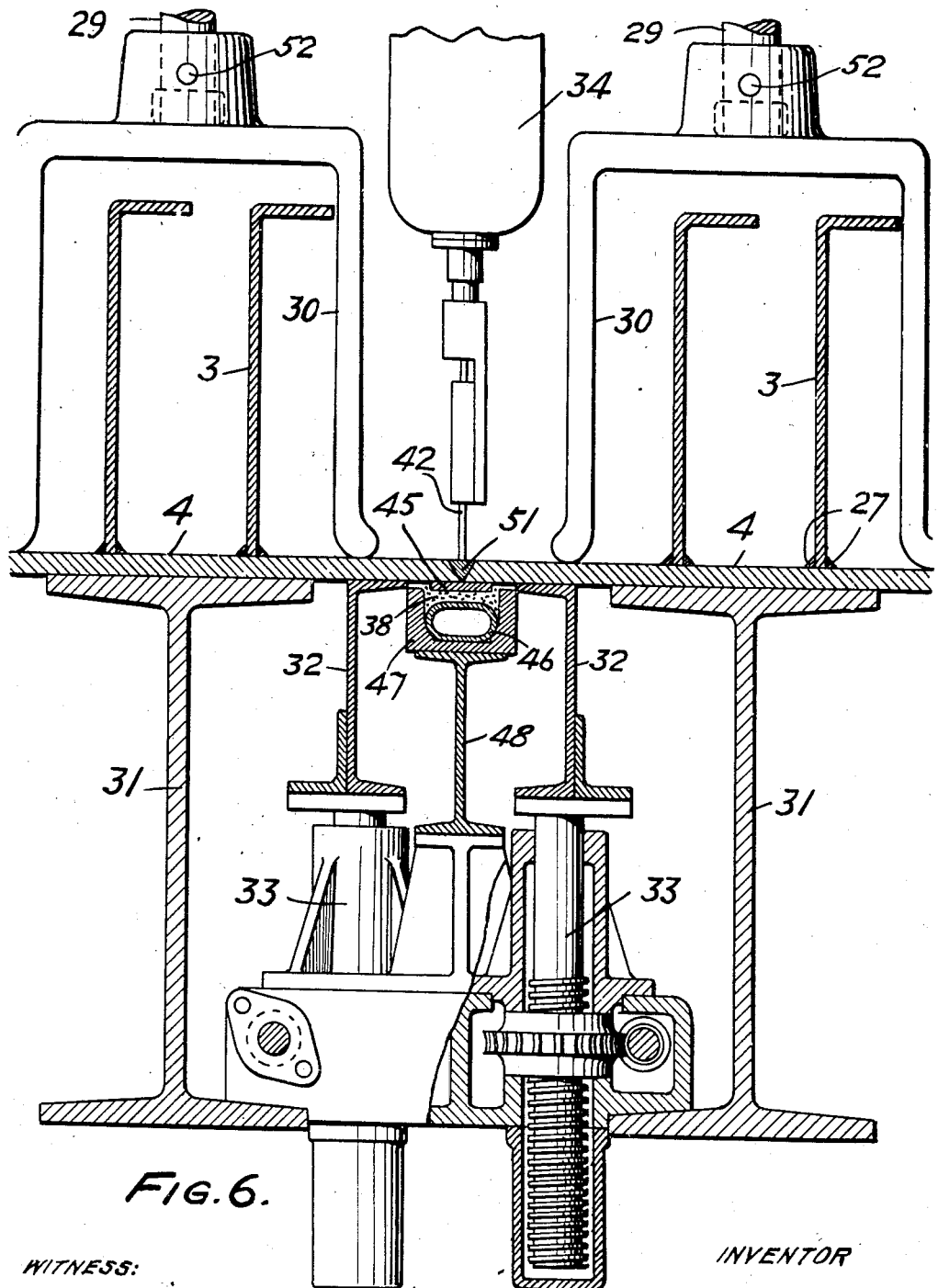
Figure 6 is a view showing details of construction of the subject of Figure 5.

The element C, shown in Figure 1, with respect to the elements A and B, is, more particularly, shown in Figures 5 and 6.

The rams, respectively, comprise pneumatic and hydraulic cylinders 28, within which are pistons and to which are connected rods 29, carrying on their lower ends yokes or bifurcated heads 30. The heads 30 are secured to the rods 29 by means of pins 52. Beneath the heads 30 are positioned heavy I-beams 31, 31 in line with the bed of castors 2, and for the support of the plates to be welded together.

Between the I-beams 31, 31 are a pair of supports 32, 32 mounted on screw jacks 33, 33 and arranged to engage the edge portions of a pair of plates to be welded and to provide means whereby plates of different thickness may be brought to a level.

The welder 34 is carried on a screw 35 depending from a trolley 36 carried by a bridge 37 running on rails 39 extending transversely of the apparatus. In its movement the trolley 36 carries the welder transversely for the welding of the abutting edges of a pair of plates. The welder 34 is of any usual electric type and may be the same as the welder 15 of element B. The welder will desirably be made reversable so that it may be operated in either direction for accomplishing the butt-welding.

The welder is supplied with melt or flux from a tank 40, through a tube 41 and with wire 42 from a reel 43. The flux tank and reel are carried with the welder on the trolley 36 and the suction side of a fan 44 communicates with a tube leading to a head following the welder for return of excess flux to the tank 40.

A copper bar 45 is positioned beneath the abutting edges of the plates and is adapted to be pressed up against the under side of the plates 4, 4 along the line of their abutting edges, to act as a dam, by means of a pneumatically inflated hose 46 carried in a channel member 47 filled with sand or melt 38, which covers the hose and protects it from the heat of the weld. The channel is supported by an I-beam 48.

In operation of the element C, the edges of the pair of plates 4, 4, having stiffeners 3 welded to the upper surfaces thereof, are brought together in alignment over the bar 45, with their edge portions supported on the I-beams 31 and the supports 32. The supports 32 are adjusted by means of the jacks 33 to provide an accurately leveled support for the edge portions of the plates, and the feet of the bifurcated heads 30 of the parallel series of rams are brought down on the upper surfaces of the plates, under pneumatic pressure supplied to the cylinders 28, to clamp the edge portions of the plates to the supports 32 and I-beams 31.

Since the heads are bifurcated, they will straddle the stiffeners carried by the plates and permit holding of the edge portions of the plates securely to the supports 32, irrespective of the location of the stiffeners. Since the supports 32 are leveled, the heads 30, acting individually, will straighten out any irregularity in the edge portions of the plates, so that their abutting edges will be exactly level.

The welder is then put into operation and moved from side to side of the plates to effect welding of their abutting edges.

During the welding operation, the bar 45 is pressed against the bottom of the joint by the inflation of the hose 46, the hose being protected from heat by the sand or melt which covers it.

During the welding operation the edge portion of the plates is held in position and prevented from warping by the heads 30.

The welding having been completed, the heads 30 are elevated and the welded plates may be moved off on the bed of rollers 2, which may extend to any desired extent.

The operations described above may produce a finished structural element, as a bulkhead. On the other hand, if, for example, as in the case of a bulkhead, it be desired to add further stiffeners, as, for example, stiffeners transverse to those already applied, such may best be accomplished by hand welding.

In use of the apparatus and in carrying out the method of this invention, it will be found that structural elements, as, for example, bulkheads, bottom, side and deck plate panels, etc. for ships, may be assembled and the parts, as stiffeners, longitudinals, or other shapes and plates, welded into an integral structure with the greatest accuracy and at a great saving in time and labor over procedure heretofore known.

It will be understood that the apparatus and method in accordance with this invention are contemplated as adaptable for use in the fabrication of structural elements other than those more particularly mentioned herein and that as a consequence any use for which the apparatus and method are adaptable is contemplated as within the scope of this invention.

It will be understood that various modification in detail may be made in the apparatus according to this invention as herein described and in the modus operandi incident to carrying out of the method as described herein in connection with the operation of the apparatus, all without departing from the scope of this invention.

This application constitutes a division of an application for patent filed by me on April 23, 1937, Serial No. 138,498 now Patent Number 2,143,109, granted January 3, 1939.

What I claim and desire to protect by Letters Patent is:

1. Apparatus for the fabrication of structural elements from plates and shapes comprising, in combination, a support for a plate, a series of heads arranged transversely of the support, rods connecting said heads with power cylinders whereby they may be raised and lowered, aligning flanges depending from the heads, drop pins extending vertically through the heads and in alignment with the flanges, said heads being adapted to be lowered to clamp a shape to a plate positioned on said support and said depending flanges and drop pins affording a guide for the alignment of a shape on a plate.

2. In apparatus for the fabrication of structural elements from plates and shapes, in combination, a support for a plate, a series of heads arranged transversely of the support, means for raising and lowering said heads, said heads being adapted to be lowered to clamp a shape to a plate positioned on said support, flanges depending from the heads respectively, said flanges affording a guide for aligning a shape on a plate and means carried by the heads respectively for clamping a shape to said flanges.

3. In apparatus for the fabrication of structural elements from plates and shapes, in combination, a support for a plate, a series of heads arranged transversely of the support, means for raising and lowering said heads, said heads being adapted to be lowered to clamp a shape to a plate positioned on said support, flanges depending from the heads respectively and drop pins extending vertically through the heads respectively in alignment with said flanges, said flanges and drop pins affording a guide for aligning a shape on a plate.

4. In apparatus for the fabrication of structural elements from plates and shapes, in combination, a support for a plate, a series of heads arranged transversely of the support, means for raising and lowering said heads, said heads being adapted to be lowered to clamp a shape to a plate positioned on said support, flanges depending from the heads respectively, drop pins extending vertically through the heads respectively in alignment with said flanges and means carried by the heads respectively for clamping a shape to said flanges and drop pins, said flanges and drop pins affording a guide for aligning a shape on a plate.

5. In apparatus for the fabrication of structural elements from plates and shapes, in combination, a support for a plate, a series of heads arranged transversely of the support, means for raising and lowering the heads, drop pins extending vertically through the heads respectively and adapted to be raised and lowered relative thereto and means for maintaining said drop pins in a raised position, said drop pins in lowered position affording a guide for aligning of a shape on a plate.

6. In apparatus for the fabrication of structural elements from plates and shapes, in combination, a support for a plate, a series of heads arranged transversely of the support, means for raising and lowering said heads, said heads being adapted to be lowered to clamp a shape to a plate positioned on said support, means depending from the heads respectively and collectively affording a guide for aligning a shape on a plate and means carried by the heads respectively for aligning a shape with said last mentioned means.

7. In apparatus for the fabrication of structural elements from plates and shapes, in combination, a support for a plate, a series of heads arranged transversely of the support, rods connecting said heads with power cylinders whereby they may be raised and lowered, said heads being adapted to be lowered to clamp a shape to a plate positioned on said support, guides carried by the heads respectively and collectively affording a guide for aligning a shape on a plate and means carried by the heads respectively for aligning a shape with respect to said guides.

8. In apparatus for the fabrication of structural elements from plates and shapes, in combination, a support for a plate, a series of heads arranged transversely of the support, means for raising and lowering said heads, said heads being adapted to be lowered to clamp a shape to a plate positioned on said support, flanges depending from the heads respectively, said flanges affording a guide for aligning a shape on a plate and means carried by the heads respectively for aligning a shape with said flanges.

9. In apparatus for the fabrication of structural elements from plates and shapes, in combination, a support for a plate, a series of heads arranged transversely of the support, and means for raising and lowering said heads, said heads being adapted to be lowered to clamp a shape to a plate positioned on said support, vertically movable means carried by said heads and adapted in lowered position to depend from said heads and collectively afford a guide for aligning a shape on a plate and means carried by the heads respectively for aligning a shape with said vertically movable means when in lowered position.

RICHARD L. BURKE.